(12) United States Patent
Okada

(10) Patent No.: US 7,132,931 B2
(45) Date of Patent: Nov. 7, 2006

(54) BICYCLE COMPUTER AND HANDLEBAR ASSEMBLY WITH BICYCLE COMPUTER

(75) Inventor: Shigekatsu Okada, Osaka (JP)

(73) Assignee: Shimano Inc., Osaka (JP)

( * ) Notice: Subject to any disclaimer, the term of this patent is extended or adjusted under 35 U.S.C. 154(b) by 222 days.

(21) Appl. No.: 10/778,316

(22) Filed: Feb. 17, 2004

(65) Prior Publication Data

US 2005/0178235 A1 Aug. 18, 2005

(51) Int. Cl.
*B60R 25/10* (2006.01)

(52) U.S. Cl. .................. 340/427; 340/425; 340/432

(58) Field of Classification Search ............ 340/425.5, 340/427, 432, 332
See application file for complete search history.

(56) References Cited

U.S. PATENT DOCUMENTS

| | | | |
|---|---|---|---|
| 2,588,671 A | 3/1952 | Tringati | |
| 4,489,307 A | 12/1984 | Nagano | |
| 5,621,382 A | 4/1997 | Yamamoto | |
| 5,992,192 A * | 11/1999 | Tual et al. | 70/233 |
| 6,029,874 A * | 2/2000 | Meggitt | 224/412 |
| 6,069,788 A * | 5/2000 | Masui | 361/683 |
| 6,165,129 A * | 12/2000 | Bates | 600/481 |
| 6,305,241 B1 | 10/2001 | Masui et al. | |
| 6,331,089 B1 | 12/2001 | Iteya | |
| 6,367,833 B1 | 4/2002 | Horiuchi | |
| 6,584,872 B1 | 7/2003 | Kojima | |

FOREIGN PATENT DOCUMENTS

| | | |
|---|---|---|
| EP | 1 201 534 A2 | 5/2002 |
| FR | 2 654 698 A1 | 5/1991 |

\* cited by examiner

*Primary Examiner*—Daryl C Pope
(74) *Attorney, Agent, or Firm*—Global IP Counselors, LLP

(57) ABSTRACT

A bicycle computer is provided that can be mounted between free ends of a handlebar to form an integrated part of the handlebar. The computer includes an elongated housing portion with first and second attachment portions disposed at first and second ends of the housing portion. The first attachment portion is arranged and configured to be coupled to one free end of the handlebar, while the second attachment portion is arranged and configured to be coupled to the other free end of the bicycle handlebar. Preferably, at least one of the attachment portions includes a retractable member receivable within a corresponding free end of the handlebar. Preferably, the bicycle computer is coupled to the free ends of the handlebar to form a closed loop.

30 Claims, 6 Drawing Sheets

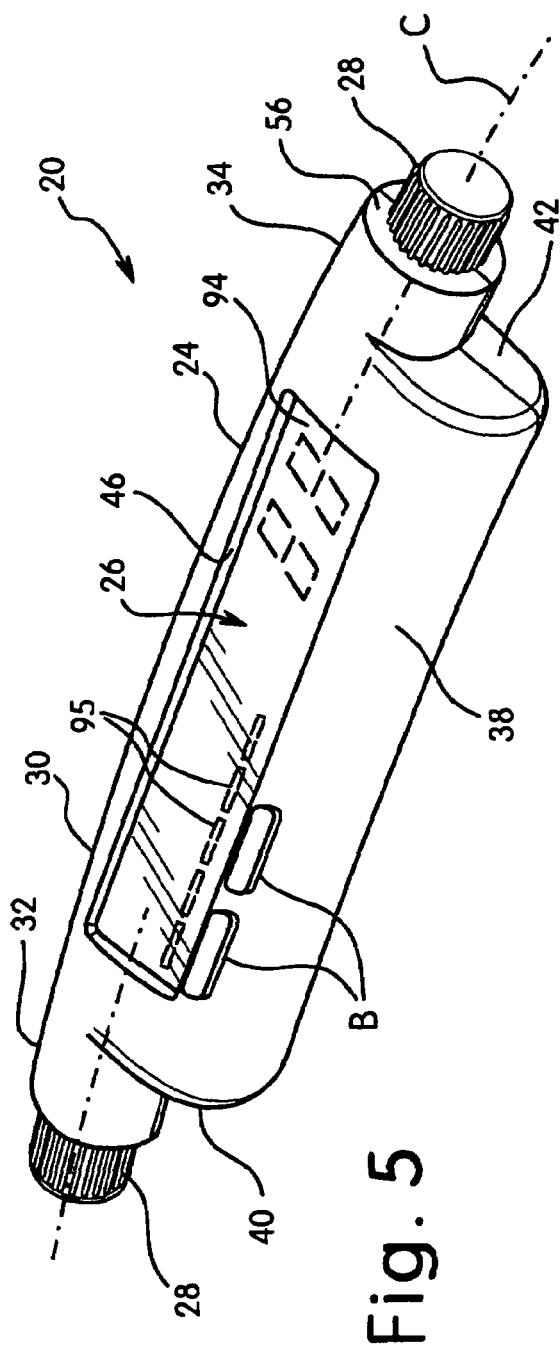
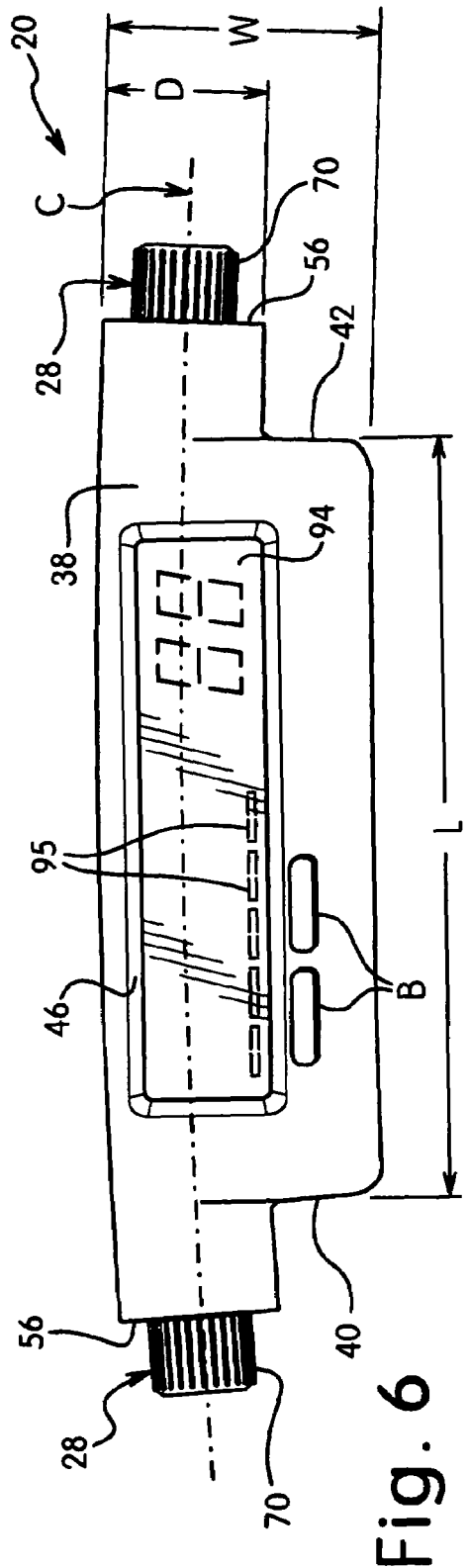

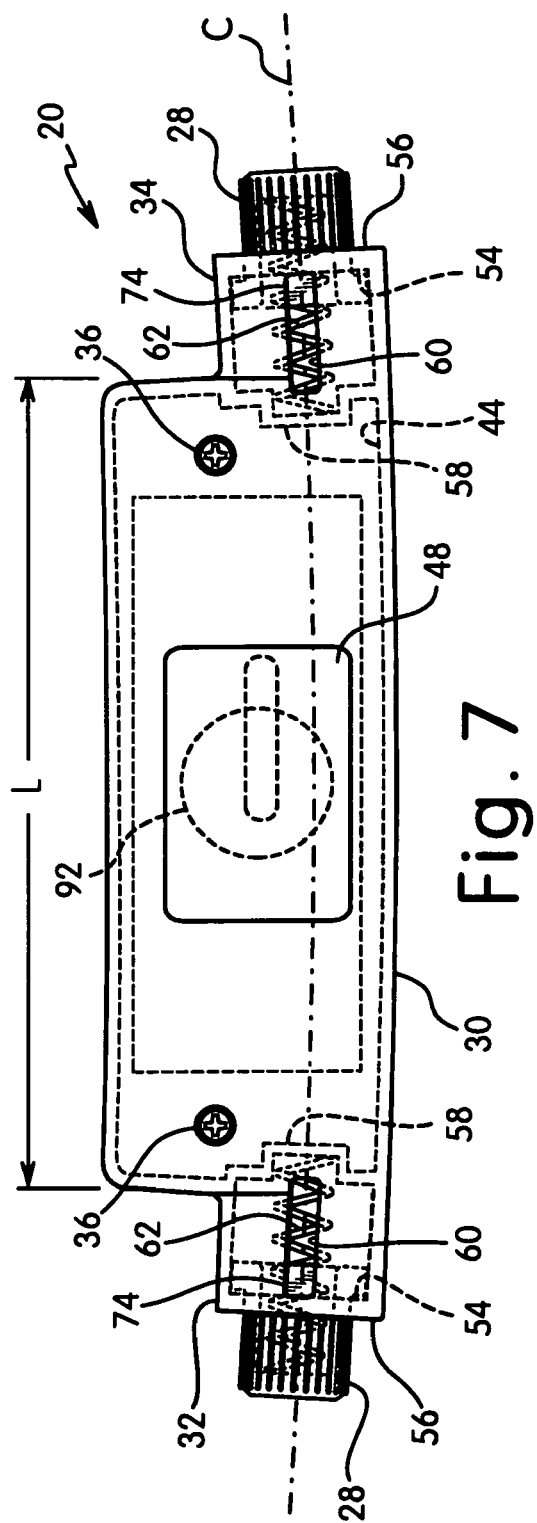
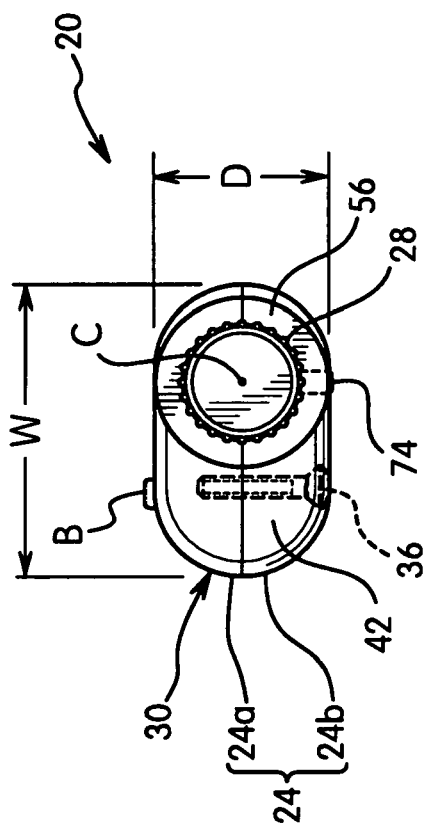
Fig. 7
Fig. 8

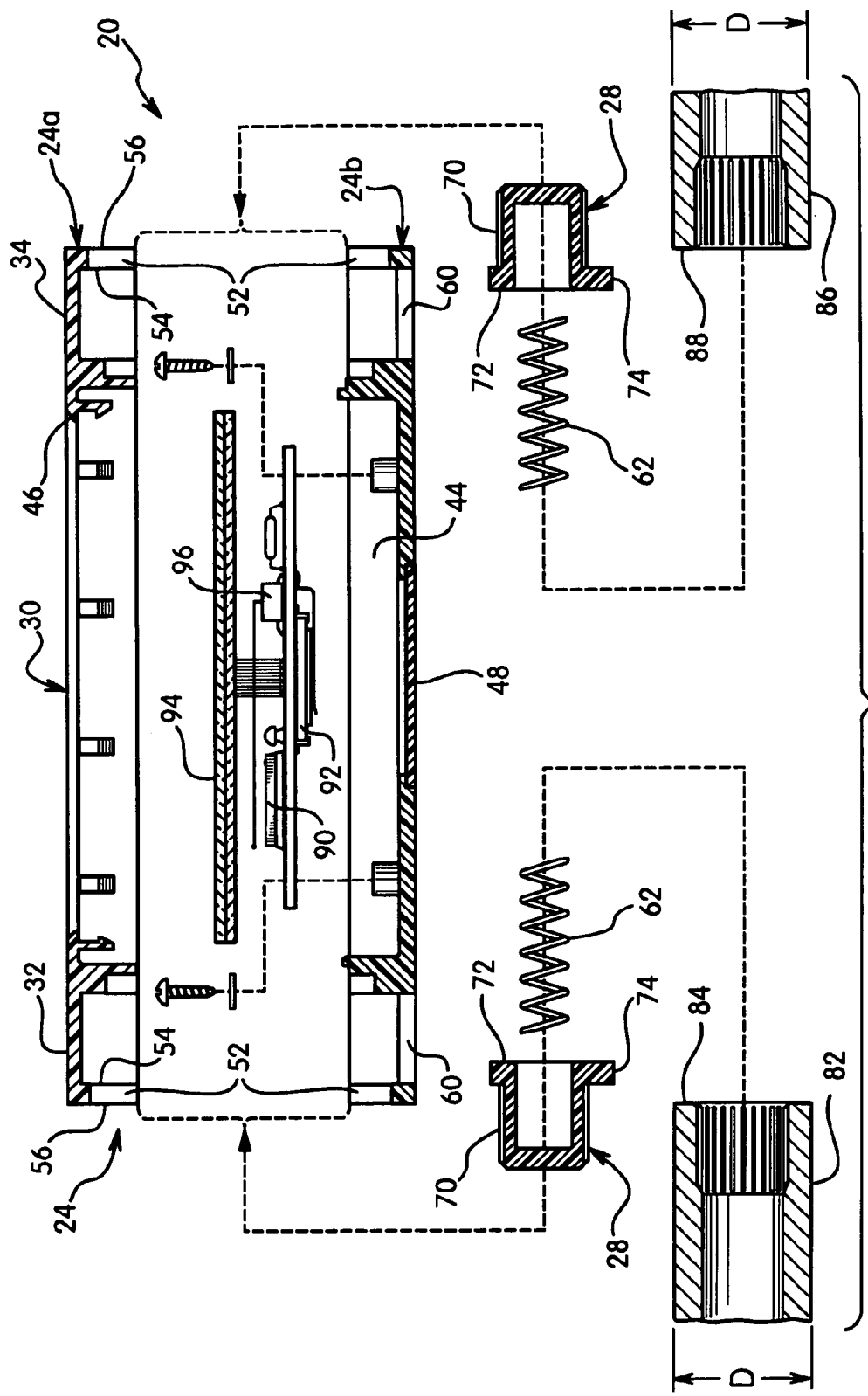

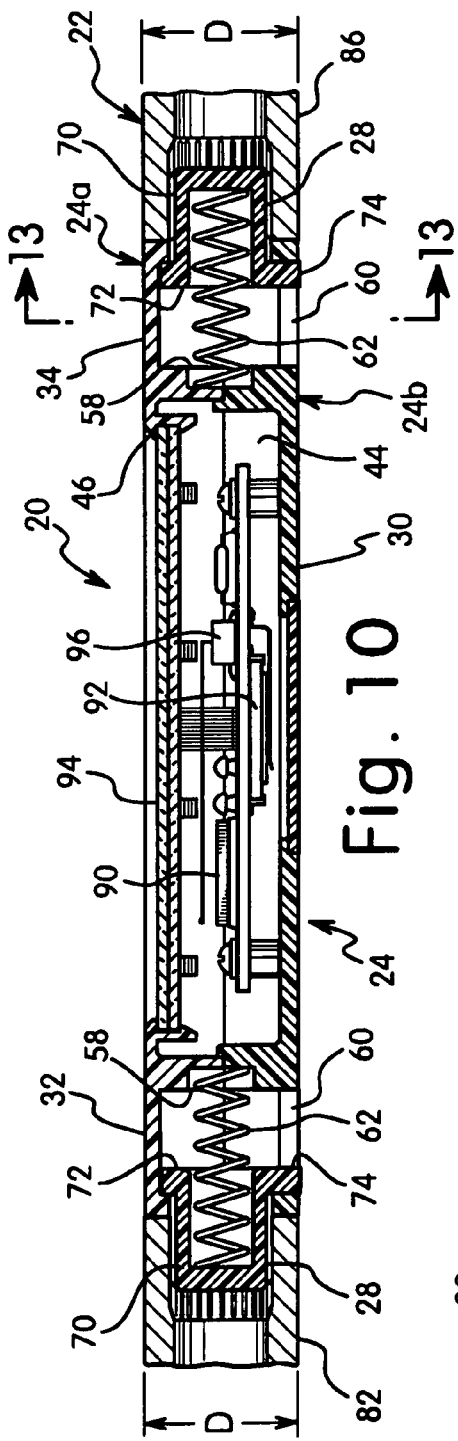
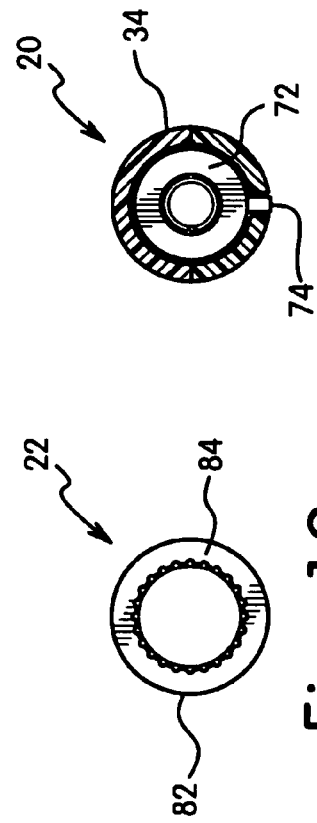
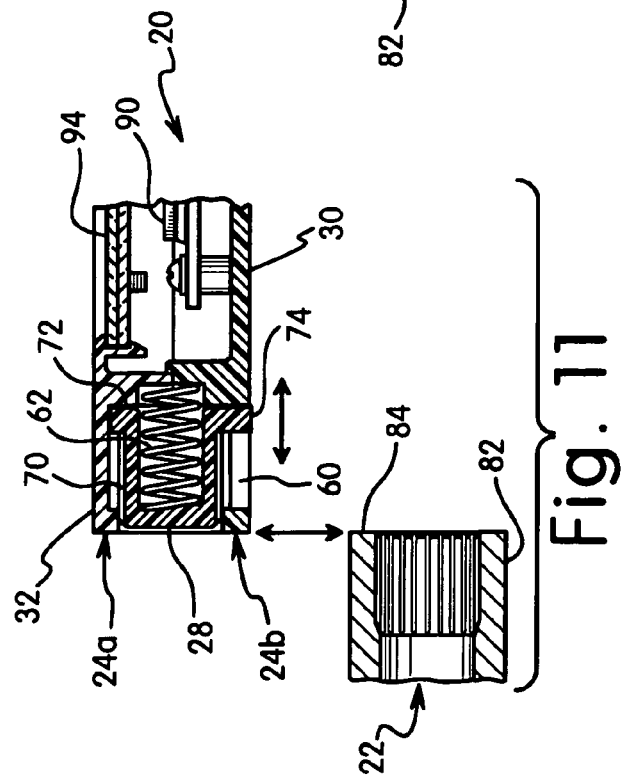

BICYCLE COMPUTER AND HANDLEBAR ASSEMBLY WITH BICYCLE COMPUTER

BACKGROUND OF THE INVENTION

1. Field of the Invention

This invention generally relates to a bicycle computer. More specifically, the present invention relates to an elongated bicycle computer mounted between free ends of a bicycle handlebar to form an integrated part of the handlebar.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that is often used with modern bicycles is the bicycle computer.

Typically, a bicycle computer unit is mounted on the handlebar in a location where the rider can view a display of the unit and operate one or more buttons of the unit. A wire usually extends from the computer unit to a front wheel sensor. The front wheel sensor sends an electrical signal to the computer unit each time a spoke magnet passes the sensor. The computer unit uses the electrical information received from the sensor to calculate various information. For example, the computer unit can display data such as speed, average speed, time, elapsed time, distance, etc. Optionally, bicycle computer units can have additional wires extending to other bicycle components or sensors such that the computer unit can display other information or make other calculations based on information from the other sensors or components. For example, the bicycle computer can be coupled to a cadence sensor, shifters, derailleurs, etc. to display various information. In any case, the bicycle computer unit is usually a separate element mounted on the handlebar via a clamping member or the like.

These typical computer units can sometimes rotate on the handlebar causing the display to not be visible to the rider or the button(s) to be difficult to access for the rider. Moreover, these units are often offset to one side of the bicycle. Thus, the rider must look sideways in order to view a display that is offset to the side of the bicycle. Depending upon the function of the unit, this may result in the rider frequently having to look for the display. Furthermore, these typical computer units often have their wires taped or strapped to the handlebars and various frame parts such as the front fork. These wires can be inadvertently torn from the unit and/or the frame of the bicycle. These wires also are often very unsightly. Finally, the computer unit can be caught on debris or the like, and can be unattractive when mounted as a separate element on the handlebar.

In view of the above, it will be apparent to those skilled in the art from this disclosure that there exists a need for an improved bicycle computer and handlebar assembly with bicycle computer, which overcomes problems in the prior art. This invention addresses this need in the art as well as other needs, which will become apparent to those skilled in the art from this disclosure.

SUMMARY OF THE INVENTION

One object of the present invention is to provide a bicycle handlebar assembly with an integrated bicycle computer, which facilitates securing the handlebar and the bicycle computer together in an integrated manner.

Another object of the present invention is to provide a bicycle handlebar assembly with an integrated bicycle computer, which has an attractive appearance.

Still another object of the present invention is to provide a bicycle handlebar assembly with an integrated bicycle computer, which has the bicycle computer transversely centrally located relative to the handlebar.

Yet still another object of the present invention is to provide a bicycle handlebar assembly with an integrated bicycle computer, which reduces the possibility of debris or the like from catching on the bicycle computer and its parts.

The foregoing objects can basically be attained by providing a bicycle computer, which comprises an elongated housing portion, an electronic component, a first attachment portion and a second attachment portion. The elongated housing portion has a central enclosure, a first end and a second end with the central enclosure disposed between the first and second ends. The electronic component is disposed in the central enclosure. The first attachment portion is disposed at the first end of the housing portion, and is arranged and configured to be coupled to a first free end of a bicycle handlebar. The second attachment portion is disposed at the second end of the housing portion, and is arranged and configured to be coupled to a second free end of the bicycle handlebar such that the housing portion is disposed between the first and second free ends of the bicycle handlebar. At least one of the first and second attachment portions includes a retractable member receivable within a corresponding one of the first and second free ends of the handlebar.

The foregoing objects can also basically be attained by providing a bicycle handlebar assembly, which comprises a handlebar and a bicycle computer. The handlebar includes a mounting portion configured and arranged to be coupled to a front fork of a bicycle, a first looped portion extending from the mounting portion to a first free end and a second looped portion extending from the mounting portion to a second free end spaced from the first free end. The bicycle computer is coupled to the first and second free ends of the handlebar to form a closed loop.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is an enlarged top perspective view of the bicycle computer of the handlebar assembly illustrated in FIGS. 1–4;

FIG. 6 is a top plan view of the bicycle computer illustrated in FIG. 5;

FIG. 7 is a bottom plan view of the bicycle computer illustrated in FIGS. 5 and 6;

FIG. 8 is an end elevational view of the bicycle computer illustrated in FIGS. 5–7;

FIG. 9 is an exploded longitudinal cross-sectional view of the handlebar assembly illustrated in FIGS. 2–4, as seen along section line 9—9 of FIG. 2 with the printed circuit board shown in elevation;

FIG. 10 is a longitudinal cross-sectional view of the handlebar assembly illustrated in FIGS. 2–4, as seen along section line 9—9 of FIG. 2;

FIG. 11 is an exploded partial cross-sectional view of one end of the handlebar assembly illustrated in FIG. 10 with the retractable member in the retracted position;

FIG. 12 is an end elevational view of the free end of the handlebar illustrated in FIG. 11; and FIG. 13 is a transverse cross-sectional view of the handlebar assembly illustrated in FIGS. 2–4 and 9–11, as seen along section line 13—13 of FIG. 10.

DETAILED DESCRIPTION OF THE PREFERRED EMBODIMENTS

A selected embodiment of the present invention will now be explained with reference to the drawings. It will be apparent to those skilled in the art from this disclosure that the following descriptions and illustrations of the selected embodiment of the present invention are provided as merely one preferred example of the present invention and not for the purpose of limiting the invention as defined by the appended claims and their equivalents.

Figure 1:
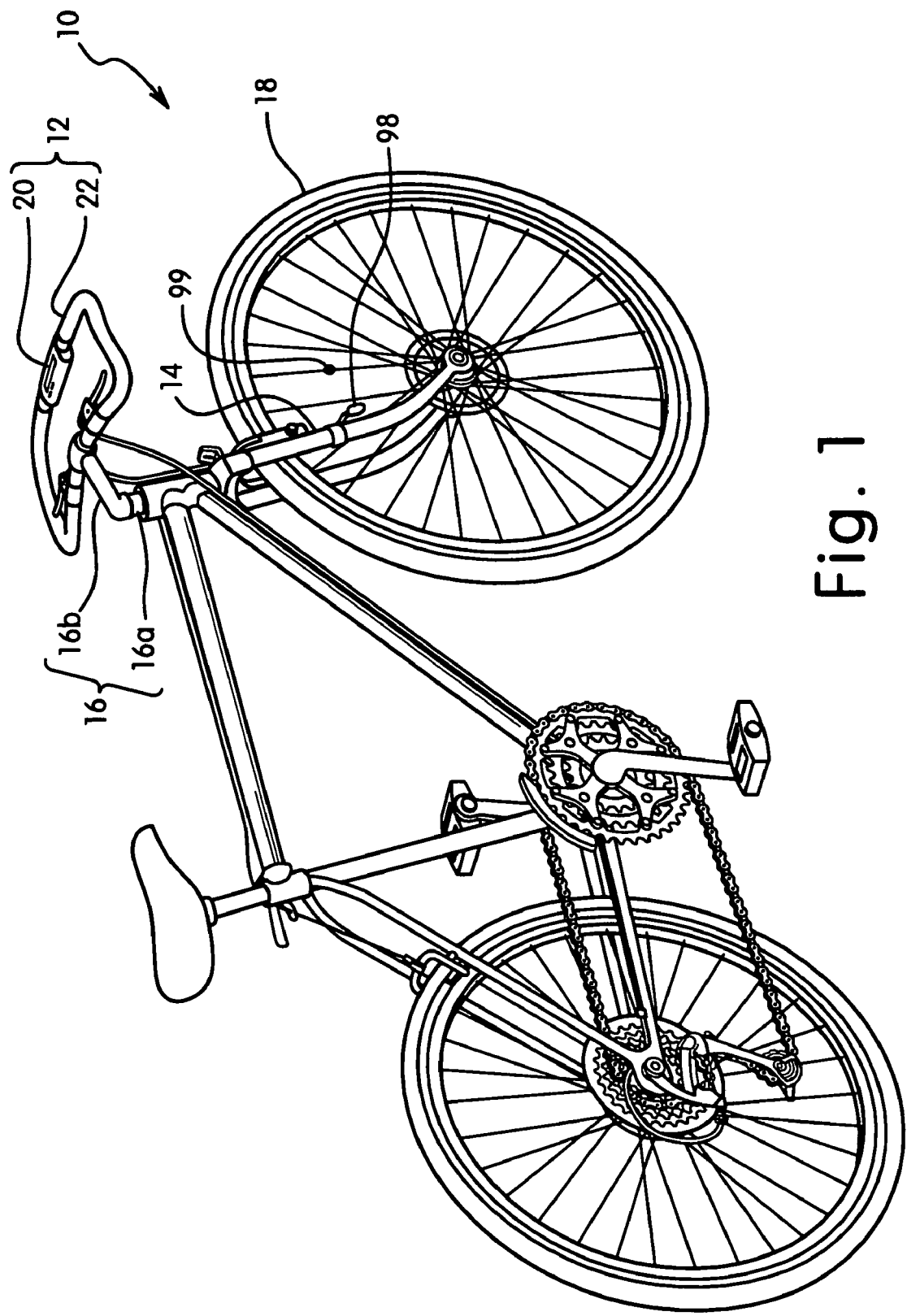
FIG. 1 is a rear side perspective view of a bicycle with a handlebar assembly in accordance with a first embodiment of the present invention.
Figure 4:
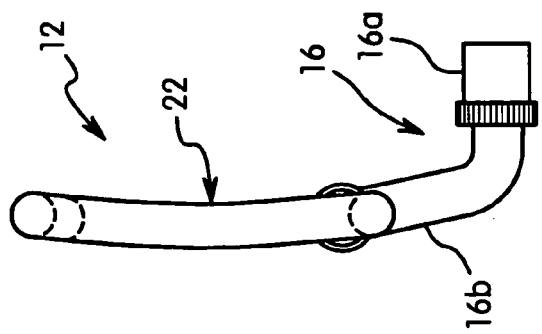
FIG. 4 is a right side elevational view of the handlebar assembly illustrated in FIGS. 2 and 3.
Figure 2:
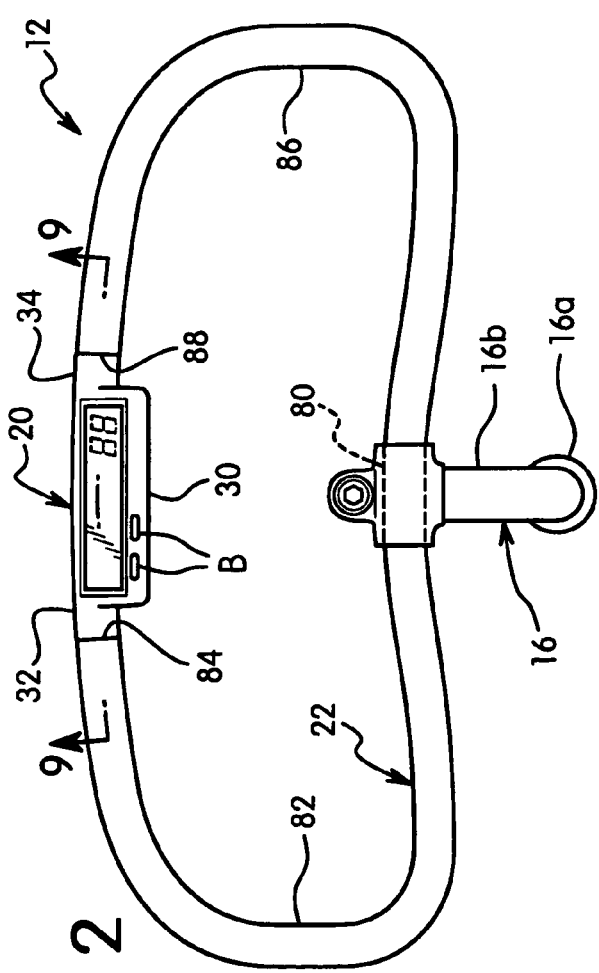
FIG. 2 is an enlarged, top plan view of the handlebar assembly illustrated in FIG. 1.
Figure 3:
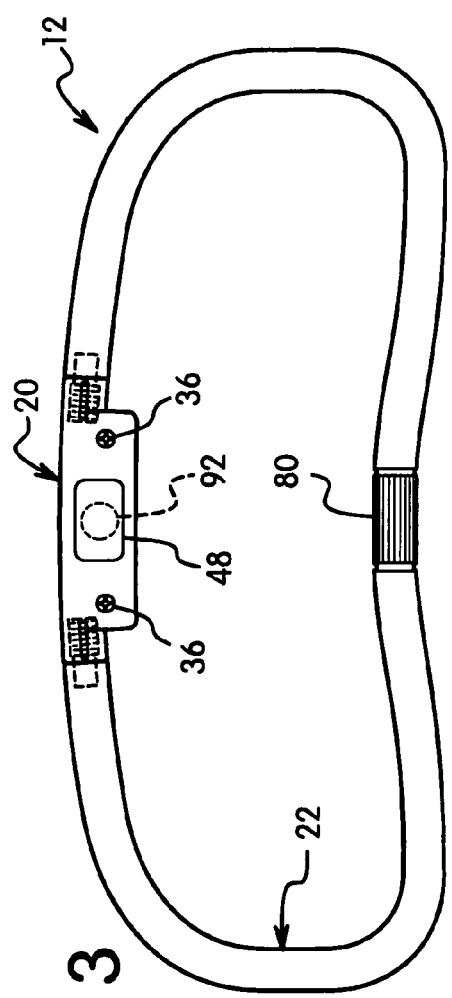
FIG. 3 is a bottom plan view of the handlebar assembly illustrated in FIG. 2.

Referring initially to FIGS. 1–4, a bicycle 10 with a handlebar assembly 12 is illustrated in accordance with a first embodiment of the present invention. The handlebar assembly 12 is coupled to a front fork 14 via a stem 16 in order to steer a front wheel 18 in a relatively conventional manner. Specifically, the front fork 14 has the front wheel 18 rotatably mounted thereto in a conventional manner, while the front fork 14 is pivotally coupled to a front portion of the frame of the bicycle 10 in a conventional manner. The bicycle 10 and its various components are well known in the prior art, except for the handlebar assembly 12 of the present invention. Thus, the bicycle 10 and its various components will not be discussed or illustrated in detail herein, except for the components that relate to the present invention.

The handlebar assembly 12 of the present invention basically includes a bicycle computer 20 and a tubular, one-piece handlebar 22. Preferably, the bicycle computer 20 is an elongated element that is coupled to the handlebar 22 in an integrated manner to form a closed loop. Specifically, the handlebar 22 is preferably a loop-shaped member with a gap or space (i.e., a break) formed therein as discussed below. The bicycle computer 20 is preferably mounted in the gap/space of the handlebar 22 to enclose the loop-shape. The bicycle computer 20 is preferably a wireless device that is absent any electrical wires extending outwardly therefrom. The handlebar 22 of the handlebar assembly 12 is preferably coupled to the front fork 14 via the stem 16 in order to steer a front wheel 18.

Referring still to FIGS. 1–4, the stem 16 preferably includes a fork mounting portion 16a and a handlebar mounting portion 16b extending at an angle to the fork mounting portion 16a. The fork mounting portion 16a is preferably non-movably coupled to the handlebar mounting portion 16b. In the illustrated embodiment, the handlebar mounting portion 16b is preferably a tubular clamping member that couples the handlebar 22 thereto in a conventional manner, while the fork mounting portion 16a is preferably a cylindrical member with an adjustable, expansion member formed at its lower end in a conventional manner. Thus, the fork mounting portion 16a is preferably mounted within a head tube of the front fork 14 in a conventional manner.

The mounting portions 16a and 16b of the stem 16 are preferably conventional. Thus, the stem 16 will not be discussed and/or illustrated in detail herein, except as related to the handlebar assembly 12 of the present invention. However, it will be apparent to those skilled in the art from this disclosure that the stem 16 can have a modified structure as needed and/or desired as long as the stem 16 is configured and arranged to cooperate with the handlebar assembly 12 in order to fixedly secure the handlebar assembly 12 to the front fork 14. For example, the stem 16 could be integrally formed with part of the handlebar assembly 12 (e.g., integrally formed with the handlebar 22) or with part of the front fork 14 (e.g., integrally formed with a head tube of the front fork 14) if needed and/or desired.

Referring now to FIGS. 2–13 the bicycle computer 20 of the handlebar assembly 12 will now be discussed in more detail. The bicycle computer 20 basically includes a case 24, an electronic component 26 mounted within the case 24 and a pair of retractable members 28 that are retractable to positions substantially within the case 24. The case 24 has a computer housing portion 30, a first attachment end 32, and a second attachment end 34. The electronic component 26 is disposed within the computer housing portion 30, while the retractable members 28 are movably disposed in the first and second attachment ends 32 and 34. The computer housing portion 30 extends between the first and second attachment ends 32 and 34. The first and second attachment ends 32 and 34 are coupled to the handlebar 22 via the retractable members 28 such that the bicycle computer 20 is integrated with the handlebar 22 to form the closed loop handlebar assembly 12. Preferably, the attachment ends 32 and 34 have an outer profile or peripheral surface that matches the outer profile or peripheral surface of the handlebar 22.

The case 24 is preferably an elongated arc-shaped element that extends along an arc-shaped (i.e., arcuate) longitudinal axis C. The case 24 is preferably constructed of a lightweight, rigid material such as a dense plastic material. However, it will be apparent to those skilled in the art from this disclosure that the case 24 could be constructed of other materials known in the art such as metallic materials as well as non-metallic materials, as needed and/or desired. In any case, the case 24 is preferably constructed by molding, machining and/or casting a pair of housing halves or parts 24a and 24b (i.e., upper and lower parts) in a conventional manner. Preferably, the parts 24a and 24b of the case 24 are formed as separate members that are coupled together with a pair of fasteners 36 in a conventional manner. The fasteners 36 are preferably threaded fasteners such as screws or the like.

Referring mainly to FIGS. 5–11, the computer housing portion 30 basically includes an outer peripheral surface 38 extending between first and second end surfaces 40 and 42, a central enclosure 44, a display screen opening 46, a battery cover 48 and a pair of computer control buttons B. The electronic component 26 is disposed in the central enclosure 44. The display screen opening 46 is formed in the upper part 24a of the case 24, while a battery opening formed in the lower part 24b has the battery cover 48 received therein via a snap-fit or the like. The battery cover 48 allows access to the central enclosure 44 when removed, yet prevents moisture and/or debris from entering the central enclosure 44 when attached to the lower part 24b. The pair of computer control buttons B are disposed on the peripheral surface 38 to face upwardly from the upper part 24a of the case 24. The computer control buttons B are designed to control the electronic component 26, as explained in more detail below.

The outer peripheral surface 38, the first and second attachment ends 32 and 34 and the first and second free end surfaces 40 and 42 are defined by both parts 24a and 24b of the case 24 when the parts 24a and 24b are coupled together. The outer peripheral surface 38 extends in a longitudinal direction about the longitudinal axis C of the case 24. The outer peripheral surface 38 extends from the first attachment end 32 to the second attachment end 34. Specifically, the outer peripheral surface 38 extends between the first and second free end surfaces 40 and 42. The outer peripheral surface 38 preferably has a substantially oval cross-sectional profile or shape as viewed along the longitudinal axis C, and a substantially uniform shape along the longitudinal axis C. However, the center axis of the oval-shaped outer peripheral surface 38 is preferably offset from the longitudinal axis C. The computer housing portion 30 is preferably arc-shaped. Thus, neither the entire casing 24 nor the computer housing portion 30 are symmetrical about the longitudinal axis C.

The first and second attachment ends 32 and 34 extend longitudinally in opposite directions from the first and second free end surfaces 40 and 42. External surfaces of the first and second attachment ends 32 and 34 are partially aligned with the outer peripheral surface 38, as discussed below. The first and second attachment ends 32 and 34 are preferably circular shaped with their centers aligned with the longitudinal axis C. The first and second attachment ends 32 and 34 are preferably tubular shaped members that have the retractable members 28 partially received therein when coupled to the handlebar 22. However, as seen in FIG. 10, the retractable members 28 can be completely retracted into the first and second attachment ends 32 and 34. Thus, the bicycle computer 20 can be detached from the handlebar 22, as explained below in more detail. The structure of the first and second attachment ends 32 and 34 and the retractable members 28 will also be explained in more detail below.

The outer peripheral surface 38 defines a maximum transverse width W of both the casing 24 and the computer housing portion 30. The maximum transverse width W is measured in a direction substantially perpendicular to the longitudinal axis C. The computer housing portion 30 preferably has a length L measured substantially along the outer peripheral surface 38 between the first and second free end surfaces 40 and 42. In other words, the length L is measured substantially along the longitudinal axis C.

As seen in FIGS. 5 and 8, the first and second attachment ends 32 and 34 each have a substantially constant circular outer diameter D that corresponds to a transverse depth of both the casing 24 and the computer housing portion 30. The outer diameter D is preferably in a range of about 20 millimeters to about 30 millimeters (e.g. slightly less than about 25 millimeters), and matches the diameter of the handlebar 22. Because the first and second attachment ends 32 and 34 extend longitudinally in opposite directions from the computer housing portion 30, the bicycle computer 20 has an overall length larger than the length L of the computer housing portion 30.

Preferably, the length L of the computer housing portion 30 is at least twice the maximum transverse width W. More specifically, the length L of the computer housing portion 30 is preferably at least about triple the maximum transverse width W. In any case, the length L is substantially larger than the maximum transverse width W. However, the bicycle computer 20 is longer than the length L due to the first and second attachment ends 32 and 34. Thus, the bicycle computer 20 preferably has an overall length substantially longer than triple the maximum transverse width W. The bicycle computer 20 preferably has an overall length between about 100 millimeters and about 200 millimeters (e.g., about 150 millimeters in the illustrated embodiment). The maximum transverse width W is preferably less than twice the outer diameter D, i.e., less than twice the diameter of the handlebar 22.

Referring mainly to FIGS. 5–13, the first and second attachment ends 32 and 34 are preferably identical to each other, except that they are mirror images of each other. Accordingly, the same reference numerals will be used to identify identical and substantially identical parts of the first and second attachment ends 32 and 34. Each of the first and second attachment ends 32 and 34 are basically tubular members that extend from the end surfaces 40 and 42 of the computer housing portion 30, respectively. Thus, the first and second attachment ends 32 and 34 are separated from the central enclosure 44 as best seen in FIG. 7. Each of the attachment ends 32 and 34 includes an inner annular flange 52 extending radially inwardly to form an internal annular abutment surface 54 and an external abutment surface 56. In other words, the annular flange 52 extends radially inwardly toward the longitudinal axis C from free ends of the tubular attachment ends 32 and 34.

The attachment ends 32 and 34 are preferably cylindrical shaped to define an internal surface and an external surface. The diameter D of each of the attachment ends 32 and 34 is defined by the external surface. A longitudinal slot 60 is preferably formed in each of the tubular attachment ends 32 and 34 that extends between the internal and external surfaces. Each retractable member 28 is at least partially received in the one of the slots 60 so the retractable members 28 can be manually retracted within the attachment ends 32 and 34.

A biasing member 62 is mounted in each of the attachment ends 32 and 34 to bias the retractable members 28 to extended positions. Preferably, the computer housing portion 30 includes an internal wall 58 that has a stepped profile to form a spring receiving recess 64. Preferably, each biasing member 62 is a coil spring with one end received in a corresponding one of the spring receiving recesses 64 and the other end received in corresponding one of retractable members 28. Each internal abutment surface 54 is designed to engage one of the retractable members 28 to retain one of the retractable members 28 at least partially within a corresponding one of the attachment ends 32 and 34. Each external abutment surface 56 contacts part of the handlebar 22, as explained below.

Referring to FIG. 9, the retractable members 28 will now be discussed in more detail. The retractable members 28 are preferably identical to each other. Each retractable member 28 is preferably constructed of a lightweight, rigid material such as a dense plastic material. However, it will be apparent to those skilled in the art from this disclosure that the retractable members 28 could be constructed of other materials known in the art such as metallic materials as well as other non-metallic materials, as needed and/or desired. In any case, each retractable member 28 is preferably constructed by molding, machining and/or casting in a conventional manner. Each retractable member 28 basically includes a tubular retractable section 70, an annular flange 72 and a projection 74.

One of the biasing members 62 is preferably partially disposed within one of the retractable members 28 to bias the retractable members 28 out of the attachment ends 32 and 34 and away from each other. The annular flange 72 preferable extends radially outwardly from the tubular retractable section 70. Each annular flange 72 is configured and arranged to contact the internal abutment surface 54 of one of the flanges 52 to prevent complete removal of the retractable members 84 from the attachment ends 32 and 34. Each projection 74 is preferably at least partially located within one of the longitudinal slots 60.

The projections 74 can extend slightly beyond the external surfaces 58 to be operable by hand as illustrated herein, or can be slightly recessed within the longitudinal slots 60 so as to require a tool to in order to access the projections 74. In either case, the projections 74 are used to retract the retractable members 28 toward each other beyond the external abutment surfaces 56 (i.e., in order to disengage the handlebar 22). Additionally, the projections 74 engage the slots 60 to prevent relative rotation of the retractable members 28 relative to the first and second attachment ends 32 and 34.

As seen in FIGS. 5–7, the tubular retractable section 70 of each retractably member 28 preferably includes a textured outer surface (e.g. provided with longitudinal ribs). Moreover, the textured outer surface of each tubular retractable section 70 is sized to be longitudinally received within the handlebar 22. However, the textured surfaces cooperate with the handlebar 22 to prevent rotation of the retractable members 28 relative to the handlebar 22 when coupled within the handlebar 22. The projections 74 further cooperate with the longitudinal slots 60 to prevent rotation of the retractable members 28 relative to the case 24, as mentioned above. Thus, when the bicycle computer 20 is coupled to the handlebar 22, the bicycle computer is non-movable coupled to be substantially integrated with the handlebar 22 to form the handlebar assembly 12 in accordance with the present invention. Mounting and dismounting the computer 20 to/from the handlebar 22 will be discussed in more detail below.

In the illustrated embodiment, the first attachment end 32, one of the retractable members 28, one of the biasing members 62 and one end of the computer housing portion 30 form a first attachment portion of the bicycle computer 20, while the second attachment end 34, one of the retractable members 28, one of the biasing members 62 and the other end of the computer housing portion 30 form a second attachment portion of the bicycle computer 20.

Referring again to FIGS. 1–4, the handlebar 22 basically includes a mounting portion 80, a first looped portion 82 extending to a first free end 84 and a second looped portion 86 extending to a second free end 88. Preferably, the mounting portion 80, the first looped portion 82, the first free end 84, the second looped portion 86 and the second free end 88 are integrally formed together as a one-piece, unitary tubular metal member. However, it will be apparent to those skilled in the art from this disclosure that the handlebar 22 could be constructed of other materials known in the art such as metallic materials as well as non-metallic materials, as needed and/or desired. Moreover, it will be apparent to those skilled in the art from this disclosure that the handlebar 22 could be constructed of several different pieces and/or could have various shapes as needed and/or desired.

As seen in FIGS. 10 and 11, each free end 84 and 88 preferably has a textured internal surface (e.g. provided with longitudinal ribs) that cooperates with the retractable members 28 to prevent relative rotation thereof. In any event, the internal surfaces of the free ends 84 and 86 and the outer surfaces of the retractable members 28 are preferably arranged and configured to allow longitudinal movement relative to each other but to prevent rotation relative to each other. In other words, it will be apparent to those skilled in the art from this disclosure that the free ends 84 and 88 of the handlebar 22 as well as the retractable members 28 can have various configurations to carry out the present invention. However, regardless of the shapes/configurations of the handlebar 22, the attachment ends 32 and 34, and the retractable members 28, these parts preferably have certain characteristics. Specifically, the retractable sections 70 and the free ends 84 and 88 of the handlebar 22 are preferably longitudinally movable relative to each other but non-rotatable relative to each other when engaged with each other. Moreover, the external surfaces or outer profile of the attachment ends 32 and 34 preferably have a sizes/shapes corresponding to the free ends 84 and 88 of the handlebar 22 such that the attachment ends 32 and 34 are flush with the handlebar 22.

Referring mainly to FIGS. 7, 9 and 10, the electronic component 26 is preferably a computer unit that includes a microcomputer 90 formed on a printed circuit board, a battery unit 92, a display screen 94 and a wireless receiver 96. The microcomputer 90 of the electronic component 26 includes a central processing unit (CPU), a random access memory component (RAM), a read only memory component (ROM), and an I/O interface. The microcomputer 90 is electrically coupled to the battery unit 92, the display screen 94 and the wireless receiver 96, as well as the computer control buttons B. The I/O interface is electrically coupled to the wireless receiver 96. The wireless receiver 96 receives wireless electrical signals from a front wheel sensor/transmitter 98 (only shown in FIG. 1) each time a magnet 99 passes the sensor/transmitter 98 in a conventional manner. The battery unit 92 supplies electrical power to the microcomputer 90 as well as the other parts of the electronic component 26 in a conventional manner.

As seen in FIGS. 5 and 6, the display screen 94 is preferably a liquid crystal display (LCD). Preferably, one of the buttons B is a mode button, which controls what information is displayed on the screen 94 such as speed, average speed, distance, time, elapsed time, etc. The screen 94 can include indicators 95 to indicate the current mode of the bicycle computer 20. The other button B is preferably a start/stop (i.e., an on/off or power) button which controls when desired information is obtained and used for calculations. The bicycle computer 20 can also be programmed to turn on/off automatically (i.e., to turn on when a signal is received from the sensor/transmitter 98, and/or to turn off after a predetermined time when no signal is received from the sensor/transmitter 98).

The various parts of the electronic component 26 such as the microcomputer 90, the battery unit 92, the display screen 94 and the wireless receiver 96 are well known in the bicycle field. In particular, the various parts of the electronic component 26 are similar to and can be understood by Shimano's Flight Deck™ bicycle computer. Therefore, the components used in the electronic component 26 will not be discussed or illustrated in further detail herein. Rather, the parts of the electronic component 26 have only be discussed and illustrated herein as needed to understand the present invention. Moreover, it will be apparent to those skilled in the art from this disclosure that electronic component 26 can include various additional electronic elements, circuitry and mechanical components to carryout the present invention.

Referring to FIGS. 1–13, the mounting and removal of the bicycle computer 20 to and from the handlebar 22 will now be discussed in more detail. When the bicycle computer 20 is mounted to the handlebar 22, the computer 20 is first positioned adjacent the gap/space of the handlebar 22. This requires the retractable members 28 to be retracted within their respective attachment ends 32 and 34. The computer 20 is then moved into its mounted position in the gap/space of the handlebar 22 and the retractable members 28 released. The retractable members 28 will then move to their extended positions within the free ends 84 and 88 of the handlebar 22. In order to remove the computer 20 from the handlebar 22, the retractable members 28 should be retracted into their respective attachment ends 32 and 34 using the projections 74. The retractable members 28 can be retracted by hand or using a tool or tools. Then the computer 20 can be moved out of the space/gap of the handlebar 22.

Of course, it will be apparent to those skilled in the art from this disclosure that the retractable members 28, the attachment ends 32 and 34, and the free ends 84 and 88 of the handlebar 22 can be configured and arranged such that only one of the retractable members 28 needs to be retracted in order to mount/dismount the computer 20 to/from the handlebar 22, if needed and/or desired. In such an arrangement, it will be apparent to those skilled in the art from this disclosure that one of the retractable members 28 could be non-movable.

As used herein, the following directional terms "forward, rearward, upward, above, downward, vertical, horizontal, below and transverse" as well as any other similar directional terms refer to those directions of the bicycle 10 in its normal riding position, with the bicycle handlebar assembly 12 attached thereto. Accordingly, these terms, as utilized to describe the bicycle handlebar assembly 12 in the claims, should be interpreted relative to bicycle 10 in its normal riding position.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle computer comprising:
   an elongated housing portion having a central enclosure, a first end and a second end with said central enclosure disposed between said first and second ends;
   an electronic component disposed in said central enclosure;
   a first attachment portion disposed at said first end of said housing portion, said first attachment portion being arranged and configured to be coupled to a first free end of a bicycle handlebar; and
   a second attachment portion disposed at said second end of said housing portion, said second attachment portion being arranged and configured to be coupled to a second free end of the bicycle handlebar such that said housing portion is disposed between the first and second free ends of the bicycle handlebar, at least one of said first and second attachment portions including a retractable member receivable within a corresponding one of the first and second free ends of the handlebar, said retractable member being manually retractable to a position within said at least one of said first and second attachment portions out of said corresponding one of the first and second free ends of the handlebar such that said bicycle computer is detachable from the handlebar.

2. The bicycle computer according to claim 1, wherein said housing portion has a length as measured between said first and second ends that is substantially greater than a maximum transverse width of said housing portion.

3. The bicycle computer according to claim 2, wherein said length of said housing portion is at least twice said maximum width of said housing portion.

4. The bicycle computer according to claim 1, wherein said housing portion has a substantially uniform cross-sectional shape as viewed in a longitudinal direction.

5. The bicycle computer according to claim 1, wherein said housing portion has a longitudinal axis through said central enclosure, said first and second ends of said housing portion and said first and second attachment portions such that said first and second attachment portions are substantially aligned with each other and said central enclosure of said housing portion.

6. The bicycle computer according to claim 5, wherein said central longitudinal axis is arcuate shaped.

7. The bicycle computer according to claim 1, wherein each of said first and second attachment portions includes a retractable member receivable within the first and second free ends of the handlebar, respectively.

8. The bicycle computer according to claim 1, wherein said retractable member is normally biased to an extended position from a retracted position.

9. The bicycle computer according to claim 1, wherein said housing portion includes a display screen.

10. The bicycle computer according to claim 9, wherein said housing portion includes at least one computer control button.

11. The bicycle computer according to claim 10, wherein said housing portion includes a pair of computer control buttons.

12. The bicycle computer according to claim 11, wherein one of said computer control buttons is a start/stop button and the other of said computer control buttons is a mode change button.

13. The bicycle computer according to claim 1, wherein said bicycle computer is a wireless cycle computer that is free of wires extending therefrom.

14. A bicycle handlebar assembly comprising:
   a handlebar including a mounting portion configured and arranged to be coupled to a front fork of a bicycle, a first looped portion extending from said mounting portion to a first free end and a second looped portion extending from said mounting portion to a second free end spaced from said first free end; and
   a bicycle computer coupled to said first and second free ends of said handlebar to form a closed loop; wherein said bicycle computer includes a first attachment portion at least partially disposed in said first free end of said first looped portion, and a second attachment portion at least partially disposed in said second free end of said second looped portion.

15. The bicycle handlebar assembly according to claim 14, wherein at least one of said first and second attachment portions includes a retractable member receivable within a corresponding one of said first and second free ends of said handlebar.

16. The bicycle handlebar assembly according to claim 15, wherein
said retractable member of said at least one of said first and second attachment portions is manually retractable to a position within said at least one of said first and second attachment portions out of said corresponding one of the first and second free ends of said handlebar such that said bicycle computer is detachable from the handlebar.

17. The bicycle handlebar assembly according to claim 15, wherein
each of said first and second attachment portions includes a retractable member at least partially received in said first and second free ends of the handlebar, respectively.

18. The bicycle handlebar assembly according to claim 15, wherein
said retractable member is normally biased to an extended position from a retracted position.

19. The bicycle handlebar assembly according to claim 14, wherein
said bicycle computer includes a housing portion with first and second attachment portions disposed at opposite ends of said housing portion, and said housing portion has a length as measured between said opposite ends of said housing portion that is substantially greater than a maximum transverse width of said housing portion.

20. The bicycle handlebar assembly according to claim 19, wherein
said length of said housing portion is at least twice said maximum width of said housing portion.

21. The bicycle handlebar assembly according to claim 19, wherein
said first and second free ends of said first and second looped portions have first and second outer diameters, and said maximum transverse width of said bicycle computer is less than twice said first and second outer diameters.

22. The bicycle handlebar assembly according to claim 21, wherein
said first and second attachment portions have first and second external surfaces that are flush with first and second outer surfaces of said first and second free ends, respectively, and
said first and second outer diameters are defined by said first and second outer surfaces, respectively.

23. The bicycle handlebar assembly according to claim 19, wherein
said housing portion has a substantially uniform cross-sectional shape as viewed in a longitudinal direction.

24. The bicycle handlebar assembly according to claim 19, wherein
said bicycle computer has a longitudinal axis that extends through said housing portion, said opposite ends of said bicycle computer, said first and second attachment portions and into said first and second free ends of said handlebar such that said first and second attachment portions are substantially aligned with each other.

25. The bicycle handlebar assembly according to claim 24, wherein
said central longitudinal axis is arcuate shaped.

26. The bicycle handlebar assembly according to claim 14, wherein
said bicycle computer includes a display screen.

27. The bicycle handlebar assembly according to claim 14, wherein
said bicycle computer includes at least one computer control button.

28. The bicycle handlebar assembly according to claim 27, wherein
said bicycle computer includes a pair of computer control buttons.

29. The bicycle handlebar assembly according to claim 28, wherein
one of said computer control buttons is a start/stop button and the other of said computer control buttons is a mode change button.

30. The bicycle handlebar assembly according to claim 14, wherein
said bicycle computer is a wireless cycle computer that is free of wires extending therefrom.

* * * * *